United States Patent [19]
Hetko

[11] Patent Number: 6,154,919
[45] Date of Patent: Dec. 5, 2000

[54] SAWDUST COLLECTION SYSTEM

[76] Inventor: Walter Hetko, 216 Lynhurst Ave., N. Syracuse, N.Y. 13212

[21] Appl. No.: 09/395,439

[22] Filed: Sep. 14, 1999

[51] Int. Cl.[7] ............................... A47L 5/38; B01D 45/16
[52] U.S. Cl. .................................. 15/339; 15/352; 15/353; 55/465
[58] Field of Search ........................... 15/353, 319, 339; 55/449, 462, 465

[56] References Cited

U.S. PATENT DOCUMENTS

| | | |
|---|---|---|
| 1,856,685 | 5/1932 | Anderson . |
| 3,322,169 | 5/1967 | Hilliard . |
| 3,490,208 | 1/1970 | Meyer et al. .......................... 15/353 X |
| 3,616,482 | 11/1971 | Brycki .................................. 15/353 X |
| 3,763,748 | 10/1973 | Gallagher, Jr. . |
| 3,945,281 | 3/1976 | Kreitz . |
| 4,145,198 | 3/1979 | Laule .................................... 15/353 X |
| 4,300,426 | 11/1981 | Weaver . |
| 4,358,300 | 11/1982 | Schlapman et al. .................. 15/353 X |
| 4,476,608 | 10/1984 | Rasmussen ................................ 15/353 |
| 4,517,638 | 5/1985 | Kuhlmann . |
| 4,838,907 | 6/1989 | Perry ................................... 15/353 X |
| 4,977,638 | 12/1990 | Best . |
| 5,525,396 | 6/1996 | Rudolph et al. ..................... 55/449 X |
| 6,027,541 | 2/2000 | Siemers ............................... 55/449 X |
| 6,044,519 | 4/2000 | Hendrix .................................. 15/319 |
| 6,066,195 | 5/2000 | Ko ........................................ 15/353 X |

*Primary Examiner*—Chris K. Moore
*Attorney, Agent, or Firm*—August E. Roehrig, Jr.; Hancock & Estabrook, LLP

[57] ABSTRACT

A system for collecting sawdust generated by a woodworking implement such as a table saw includes a funnel for directing sawdust from the saw to one end of a first hose, the other end of which communicates with a box-like structure having side and top walls and an open lower end. The interior of the box is divided into first and second compartments by a first portion of a baffle having edge portions positioned in grooves in opposing surfaces of two of the side walls of the box, the other two side walls having openings through which the other end of the first hose and one end of a second hose communicate with the first and second compartments, respectively. The box is affixed to the lid of a container in which the sawdust is collected. The open lower end of the box communicates with the interior of the container through an opening in the lid. The box is affixed to the lid by fasteners extending through strips surrounding the lid opening and through the lid, into the lower edges of the box side walls. A second portion of the baffle extends through the lower end of the box and through the lid opening into the container. Shoulders on each side of the second portion of the baffle rest upon the lid surface adjacent the opening therein to prevent the baffle from sliding out of the grooves in the box side walls.

20 Claims, 4 Drawing Sheets

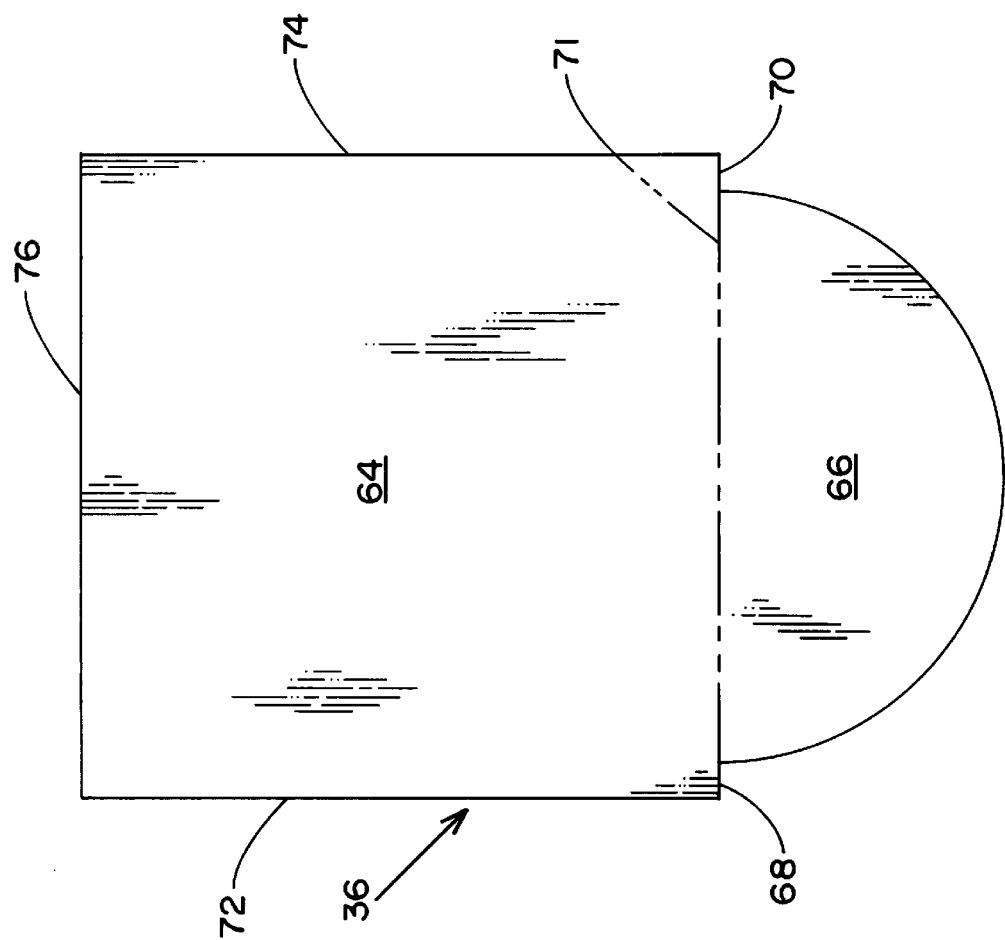

SAWDUST COLLECTION SYSTEM

BACKGROUND OF THE INVENTION

The present invention relates to a system for collecting sawdust from a table saw, or other such electrically powered, woodworking implement; more specifically, the invention relates to apparatus for collecting sawdust which is drawn from the area where it is created by vacuum means and which is retained in a container in advance of the vacuum means by baffle means in communication with the container.

Sawdust is produced by many power-driven tools, including table saws, during wood cutting operations. It is desirable to confine the sawdust to a specific area from which it may be easily collected and disposed of. A number of systems have been devised for this purpose, but most have the disadvantage of complexity, which increases the cost, making them unsuitable for use in a small, home workshop. Others may be large, heavy and bulky and/or require use in connection with other, custom-designed apparatus, again increasing cost and reducing customer appeal to the small-scale user. It is also desirable that the sawdust collection system operate automatically, whenever the woodworking implement is operating.

It is a principal object of the present invention to provide sawdust collecting apparatus for use with conventional, commercially available, wood-cutting power tools which may be quickly and easily installed and maintained, and is essentially automatic in operation, as well as being extremely inexpensive to manufacture.

A further object is to provide gravity-type sawdust collection apparatus highly suitable in cost and simplicity for home shop use.

Another object is to provide a sawdust collection system which is automatic in operation, i.e., which operates to collect and confine sawdust any time a woodworking implement is operated without further action on the part of the operator.

Additional objects will in part be obvious and will in part appear hereinafter.

SUMMARY OF THE INVENTION

Means for receiving sawdust at the location where it is generated are provided in the form of a funnel removably affixed to the frame of the table saw directly below the saw blade. The funnel tapers inwardly and downwardly to an opening communicating with one end of a first, flexible hose. A box-like structure, having openings in two, opposite, vertical walls, is positioned on the removable lid of a container. The first hose communicates at its other end with the opening in one of the box walls, and a second, flexible hose communicates at opposite ends with the opening in the other box wall and with vacuum producing means, preferably a conventional vacuum cleaner of the type with which many home shops are equipped. A baffle in the form of a vertical wall separates the box into two compartments and extends downwardly into the container. The box is bottomless and communicates with the interior of the container through an opening in the lid.

Both the table saw and the vacuum are connected, through a single on-off switch, with a cord having a plug for insertion in a standard wall outlet. Thus, when the saw is turned on, the vacuum is also turned on. The vacuum draws air from the container through the box compartment on the outlet side of the baffle. Air must therefore enter the container through the box compartment on the inlet side of the baffle, being drawn in through the first hose and the funnel. Any sawdust generated by the saw is drawn downwardly, through the funnel and first hose, into the box and toward the baffle. Since the air must flow upwardly from the container to the box compartment on the outlet side of the baffle, sawdust collects by gravity in the container, from which it may be removed simply by removing the lid (together with the box) and emptying the container in any desired location. Virtually no sawdust reaches the collecting bag of the vacuum.

BRIEF DESCRIPTION OF THE DRAWINGS

FIGS. 3a and 3b are elevational views of another element, a portion of which is seen in FIG. 1.

DETAILED DESCRIPTION

Figure 1:
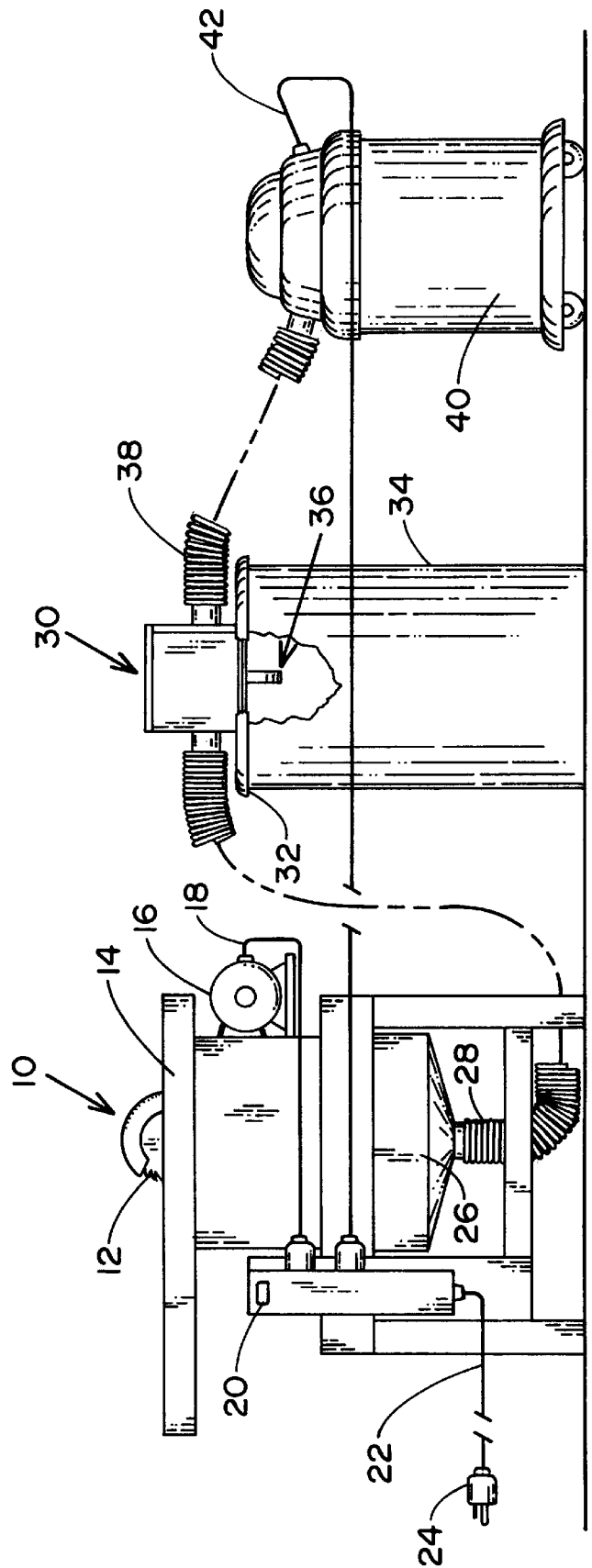
FIG. 1 is a front elevational view of the complete sawdust collection system of the invention.

Referring now to the drawings, the sawdust collection system of the invention is shown in combination with table saw 10, having circular blade 12, and a table 14 upon which a board to be cut is placed. Blade 12 is rotated by electric motor 16 connected by line 18, through on/off switch 20 and line 22, to plug 24 which is inserted into a standard AC outlet (not shown). Funnel 26, preferably of sheet metal, is removably affixed to the underside of the table of saw 10, below blade 12. Funnel 26 converges downwardly to an opening at its lower end with which one end of flexible hose 28 communicates. The elements of table saw 10 and its means of operation are entirely conventional and the invention may be practiced with various models of saws or other sawdust-producing implements to which collecting means such as funnel 26 may be attached in position for receiving the sawdust. That is, the invention is not limited to use with only a single type or model of woodworking implement.

The end of flexible hose 28 remote from funnel 26 communicates with the interior of an element of the invention termed a box and denoted generally by reference numeral 30. Box 30 is affixed, as explained later in more detail, to circular lid 32 which removably rests atop cylindrical container 34. The interior of box 30 communicates with container 34 through the open bottom of the box and a square opening in lid 32. The interior of box 30 is divided into two compartments by a dividing wall or baffle, denoted generally by reference numeral 36, a portion of which is seen in FIG. 1. A second flexible hose 38 communicates at one end with the interior of box 30 and at the other end with vacuum means 40, preferably a conventional type of vacuum machine with which many home shops are equipped. Vacuum 40 is connected, through line 42 and on/off switch 20, to line 22 and plug 24. Thus, vacuum 40 is activated whenever switch 20 is turned on to operate saw 10.

Figure 2C:
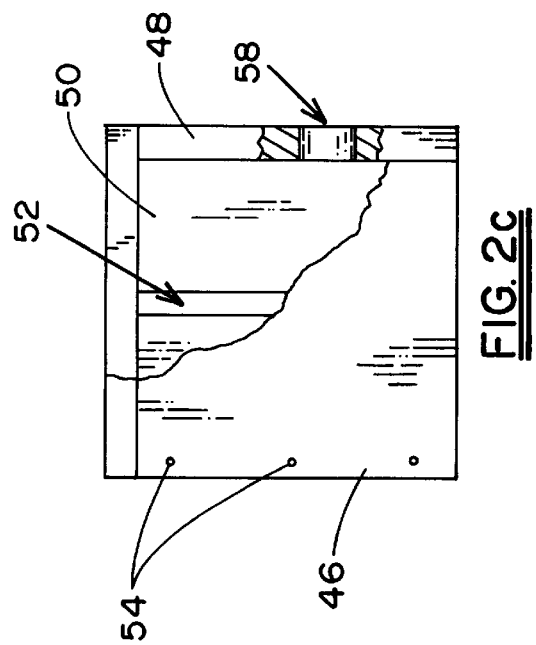
FIGS. 2a, 2b and 2c are top plan, side elevational and front elevational views, respectively, of one of the elements shown in FIG. 1, partly in section and with portions broken away.
Figure 2A:
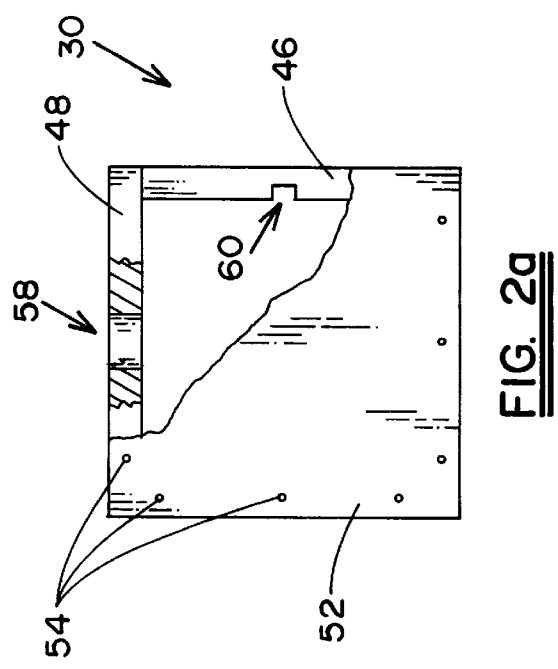
Figure 2B:
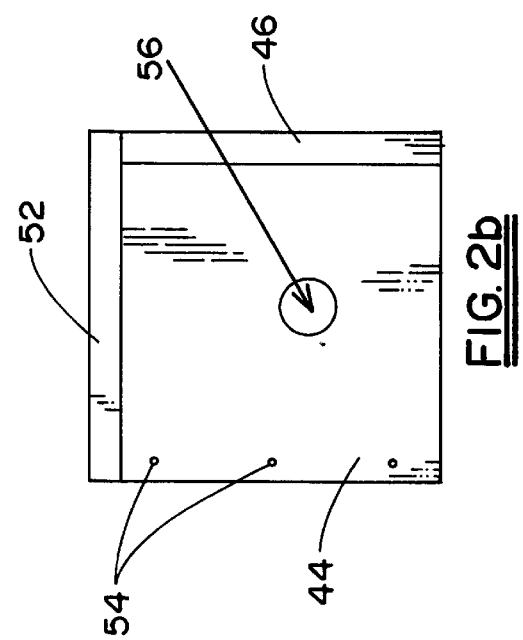

Referring now to FIGS. 2a–2c, details of box 30 are shown in more detail. Box 30 includes four side walls 44, 46, 48 and 50 and top wall 52, mutually connected at adjacent edges by nails or screws 54. Circular openings 56 and 58 are formed in one pair of opposite side walls 44 and 48, respectively, and vertically extending grooves 60 and 62 are formed in the other pair of opposite side walls 46 and 50, respectively, approximately midway between walls 44 and 48. Baffle 36, as seen in FIGS. 3a and 3b, includes integral upper, rectangular portion 64 and lower, curved portion 66. Shoulders 68 and 70 extend outwardly from lower portion 66 where the upper and lower portions meet along junction line 71. Upper portion 64 includes side edges 72, 74 and upper edge 76.

Figure 4A:
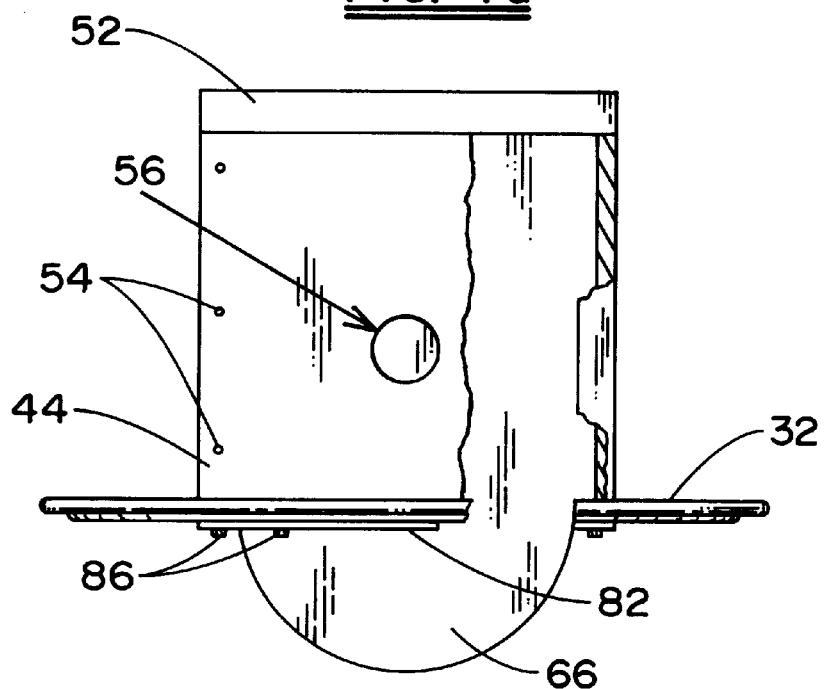
FIGS. 4a and 4b are side elevational and bottom plan views, respectively, of the elements of FIGS. 2 and 3 in combination with one another and with a further element seen in FIG. 1.
Figure 4B:
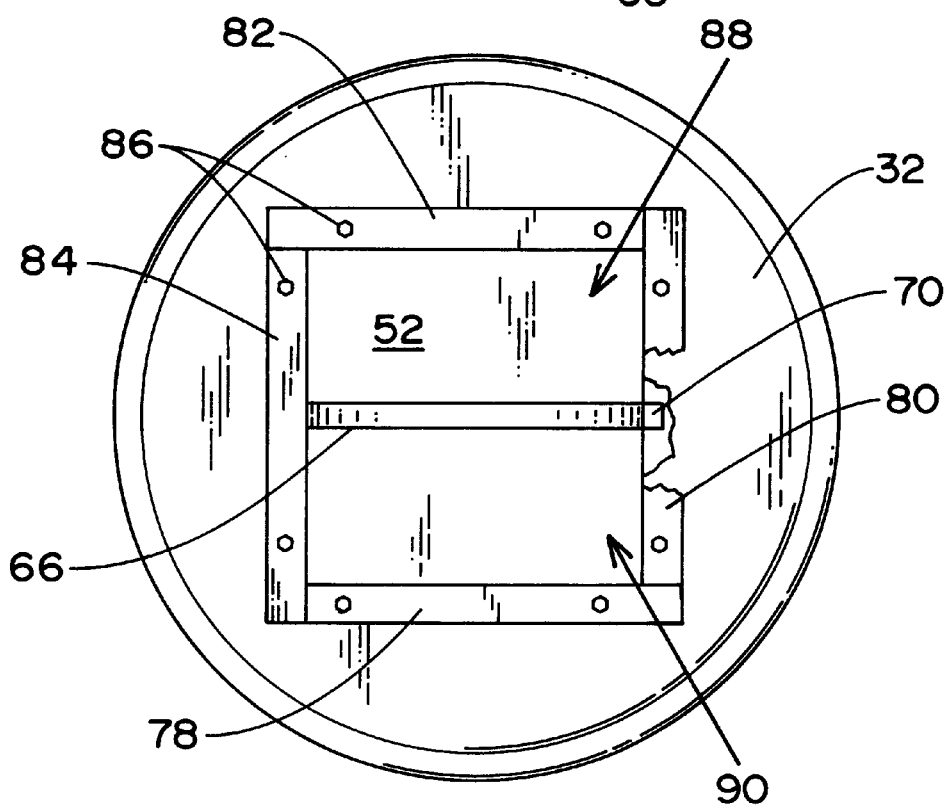

Box 30 is assembled with baffle 36 and lid 32 in the manner illustrated in FIGS. 4a and 4b. Preferably, box 30 is placed upside down, with top wall 52 resting on a horizontal surface, and portions adjacent side edges 72 and 74 are slid into grooves 60 and 62 until edge 76 contacts the interior surface of top wall 52. Upper portion 64 is so dimensioned relative to box 30 that shoulders 68 and 70 are substantially in the same plane as the free edges of side walls 44, 46, 48 and 50 when baffle 36 is fully inserted in box 30. Lid 32 is inverted to place its upper surface, as seen in FIGS. 1 and 4a, facing downwardly and is laid upon the free edges (i.e., the edges opposite top wall 52) of side walls 44, 46, 48 and 50 of box 30. The square opening in lid 32 has side edges equal in length to the interior side edges of box 30 at the open end thereof. This dimension is also equal to the width of lower baffle portion 66 between shoulders 68 and 70. Thus, the baffle will insure that the opening in lid 32 is in lateral registration with the open bottom of box 30 when the elements are assembled.

Reinforcing strips 78, 80, 82 and 84, of wood or plastic, are placed upon the upwardly facing, lower surface of lid 32, with inner edges of the strips in registration with the edges of the square opening in the lid, as seen in FIG. 4b. Nails or threaded fasteners 86 are then inserted through strips 78, 80, 82 and 84 and though lid 32 into the edges of side walls 44, 46, 48 and 50. Thus, box 30, lid 32 and baffle 36 are unified, permitting the assembly to be inverted to its normal position of use. Shoulders 68 and 70 rest upon portions of lid 32 immediately adjacent the edges of the opening therein so that baffle 36 cannot disengage from grooves 60 and 62. The interior of box 30 is divided by baffle 36 into two compartments 88 and 90.

When switch 20 is placed in the "on" position to operate table saw 10, vacuum 40 is also powered and draws air through hose 38 from box compartment 90. Air flow is thus created from funnel 26, through hose 28, and box compartment 88. The sawdust drawn into compartment 88 cannot pass directly into compartment 90 due to the presence of baffle 36, but rather must pass downwardly into container 34 where it falls by gravity and is collected. Baffle 36 is constructed from a sheet of metal or very hard wood or plastic to resist the abrading effect of the sawdust. Both the work area and the interior of vacuum 40 are kept essentially free of sawdust by the collection system of the invention with very simple and low-cost structure.

What is claimed is:

1. A system for collecting sawdust generated by an electrically powered, woodworking implement, said system comprising:

a) means positioned below said implement for receiving sawdust generated thereby;

b) a box-like structure having side and top walls and an open lower side;

c) an open-topped container for deposit of the collected sawdust;

d) a removable lid covering said container, said lid having an opening therein;

e) means affixing said box-like structure to said lid with said open lower side in registration with said lid opening;

f) baffle means providing a vertical wall separating said box-like structure into first and second, side-by-side compartments;

g) electrically operated vacuum cleaner means;

h) first hose means having opposite ends and communicating at one end with said receiving means and at the other end with said first compartment;

i) second hose means having opposite ends and communicating at one end with said second compartment and at the other end with said vacuum cleaner means; and j) a common on/off switch through which both said implement and said vacuum cleaner means are connected to a source of operating power.

2. The system of claim 1 wherein the volume of said container is several times the volume of said box-like structure.

3. The system of claim 1 wherein said top wall and lid are in spaced, substantially parallel, horizontal planes and said side walls and said baffle means are in substantially vertical planes.

4. The system of claim 1 wherein said first and second hoses are flexible.

5. The system of claim 1 wherein said baffle means includes a first, rectangular portion positioned entirely within said box-like structure and a second portion extending integrally from said first portion downwardly through said lid opening into said container.

6. The system of claim 5 wherein said second portion of said baffle means is narrower than said first portion, and further including a pair of shoulders on each side of said second portion at the juncture thereof with said first portion.

7. The system of claim 6 wherein said opening in said lid has a width substantially equal to the width of said second portion of said baffle means and said shoulders rest upon said lid on opposite sides of said opening.

8. The system of claim 7 and further including a vertically extending groove in the opposing surfaces of each of a first pair of said side walls, marginal edge portions of said first portion of said baffle means being positioned in said grooves.

9. The system of claim 8 and further including an opening in each of a second pair of said side walls, said first and second hose means communicating with said first and second compartments, respectively, through said openings in said second pair of side walls.

10. The system of claim 7 wherein said second portion of said baffle means is substantially semi-circular in outline between said shoulders.

11. Apparatus for use in combination with an open-topped container wherein sawdust generated by a woodworking implement is collected by gravity and by air flow created by a conventional vacuum cleaner, said apparatus comprising:

a) a box-like structure having four, vertical side walls, a horizontal top wall and an open lower side;

b) a lid dimensioned to cover and close the open top of said container, said lid having an opening therein of substantially the same dimensions as said open lower side of said box-like structure;

c) a vertically extending, linear groove in opposing surfaces of each of a first pair of said side walls, and an opening through each of the second pair of said side walls;

d) baffle means comprising first and second portions formed from a single sheet of material and meeting at a linear juncture, said first portion being rectangular with a height substantially equal to the height of the interior of said box-like structure and a width greater than the distance between said opposing surfaces of said first pair of side walls and less than the distance between the bottoms of said grooves, opposite edge portions of said first portion of said baffle means being positioned in said grooves, whereby said first portion divides the interior of said box-like structure into first and second, side-by-side compartments with the openings through said second pair of side walls respectively communicating with said compartments; and e) means affixing said box-like structure to said lid with said lid opening in registration with said open lower side of said box-like structure and said second portion of said baffle means extending through said lid opening.

12. The apparatus of claim 11 wherein said second portion of said baffle means is narrower than said first portion, and further comprising first and second shoulders on opposite sides of said second portion extending along said linear junction of said first and second portions.

13. The apparatus of claim 12 wherein said second portion is substantially semi-circular in outline between said shoulders.

14. The apparatus of claim 13 wherein said second portion has a height less than one-half the height of said first portion.

15. The apparatus of claim 12 wherein said shoulders rest upon portions of said lid immediately adjacent said lid opening.

16. The apparatus of claim 15 wherein said affixing means comprise fasteners extending through said lid and into at least some of said side walls outwardly adjacent said lid opening.

17. The apparatus of claim 16 and further comprising four, elongated strips of material surrounding said lid opening on the side of said lid opposite said box-like structure, said fasteners extending through both said strips and said lid.

18. The apparatus of claim 11 and further including first and second hose means each having two, opposite ends, one end of said first hose means being connected to said box-like structure to communicate with said first compartment through the opening in one of said second pair of side walls, and one end of said second hose means being connected to said box-like structure to communicate with said second compartment through the opening in the other of said second pair of side walls, whereby the other ends of said first and second hose means may be connected to the source of the sawdust and to vacuum cleaner means, respectively, to draw sawdust from said source to said box-like structure where the sawdust meets said baffle means and falls by gravity into said container.

19. The apparatus of claim 18 wherein both of said first and second hose means are flexible.

20. The apparatus of claim 19 wherein said first and second compartments are substantially equal in volume.

* * * * *